US009803367B2

United States Patent
Rotter

(10) Patent No.: US 9,803,367 B2
(45) Date of Patent: Oct. 31, 2017

(54) VENTILATION SYSTEM FOR TILE ROOFS

(71) Applicant: Martin J. Rotter, Glenside, PA (US)

(72) Inventor: Martin J. Rotter, Glenside, PA (US)

( * ) Notice: Subject to any disclaimer, the term of this patent is extended or adjusted under 35 U.S.C. 154(b) by 107 days.

(21) Appl. No.: 14/938,538

(22) Filed: Nov. 11, 2015

(65) Prior Publication Data
US 2016/0138270 A1    May 19, 2016

Related U.S. Application Data

(63) Continuation of application No. 12/135,641, filed on Jun. 9, 2008, now abandoned.

(60) Provisional application No. 60/942,712, filed on Jun. 8, 2007.

(51) Int. Cl.
F24F 7/02 (2006.01)
E04D 13/17 (2006.01)
B23P 19/00 (2006.01)

(52) U.S. Cl.
CPC ............ *E04D 13/176* (2013.01); *B23P 19/00* (2013.01); *E04D 13/174* (2013.01)

(58) Field of Classification Search
CPC .......................................... F24F 7/02
USPC ................................. 454/365, 364
See application file for complete search history.

(56) References Cited

U.S. PATENT DOCUMENTS

| 4,545,292 | A | 10/1985 | Inokawa et al. |
| 4,573,291 | A | 3/1986 | Hofmann |
| 4,876,950 | A | 10/1989 | Rudeen |
| 5,002,816 | A | 3/1991 | Hofmann et al. |
| 5,326,318 | A | 7/1994 | Rotter |
| 5,339,582 | A | 8/1994 | Sells |
| 5,427,571 | A * | 6/1995 | Sells .......................... E04D 3/40 454/365 |
| 6,015,343 | A * | 1/2000 | Castillo ................. E04D 13/174 454/365 |
| 6,077,159 | A * | 6/2000 | Clayton ................. E04D 13/174 454/250 |
| 6,128,870 | A * | 10/2000 | Kohler .................. E04D 1/3402 454/365 |
| 6,267,668 | B1 * | 7/2001 | Morris .................. E04D 13/174 454/365 |
| 6,286,273 | B1 * | 9/2001 | Villela .................. E04D 13/174 454/365 |
| 6,537,147 | B2 | 3/2003 | Smith |
| 6,598,353 | B1 * | 7/2003 | Reeves .................... E04D 1/36 277/590 |
| 6,662,509 | B2 | 12/2003 | Sharp et al. |
| 6,695,849 | B2 * | 2/2004 | Michelson ......... A61B 10/0096 606/170 |
| 6,773,342 | B2 | 8/2004 | Rotter |

(Continued)

*Primary Examiner* — Steven B McAllister
*Assistant Examiner* — Samantha Miller
(74) *Attorney, Agent, or Firm* — Volpe and Koenig, P.C.

(57) ABSTRACT

A ridge vent for tile roofs is provided having a vent strip located on each side of a roof ridge. The ridge vent includes a center water dam having a centering portion and two leg portions, with the centering portion being located over a ridge board. The vent strips includes a vent material, formed from a non-woven mat, including a first surface, which matches a surface of the tile roof, and a second surface. An upper water barrier is attached to the second surface of at least one of the vent strips and extends over the roof ridge. The ridge vent is rollable and can be provided as one piece or as separate components.

19 Claims, 13 Drawing Sheets

(56) References Cited

U.S. PATENT DOCUMENTS

| | | |
|---|---|---|
| 6,966,156 B2 | 11/2005 | Dixon |
| 2002/0193065 A1* | 12/2002 | Morris .................. E04D 13/176 454/365 |
| 2003/0140582 A1 | 7/2003 | Sells |
| 2005/0239392 A1 | 10/2005 | Sells |
| 2006/0019598 A1 | 1/2006 | Rotter |

* cited by examiner

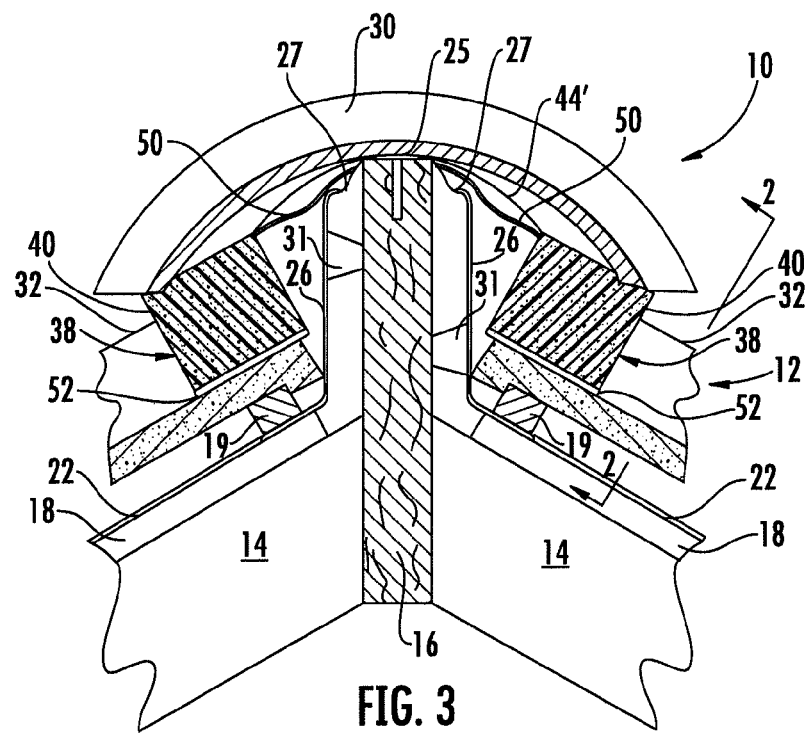
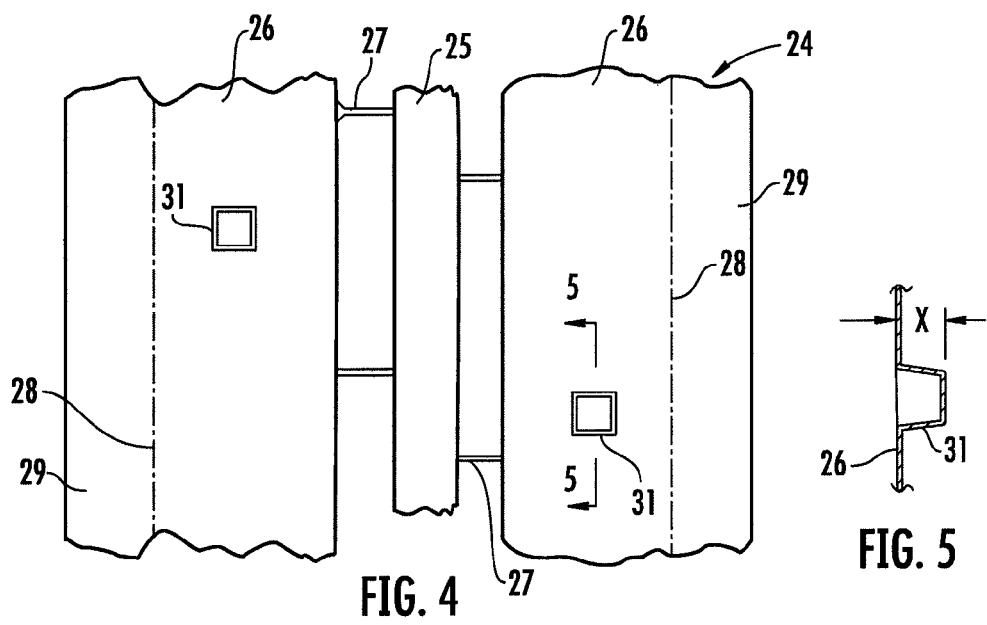

VENTILATION SYSTEM FOR TILE ROOFS

CROSS REFERENCE TO RELATED APPLICATIONS

This application is a continuation of U.S. patent application Ser. No. 12/135,641, filed Jun. 9, 2008, which claims the benefit of U.S. Provisional Patent Application No. 60/942,712, filed Jun. 8, 2007, both of which are incorporated herein by reference as if fully set forth.

BACKGROUND

This invention is related to the general field of attic and roof ventilation systems. It is particularly related to a roof ridge ventilating system for tile roofs.

It has been a long known practice to ventilate attics under gable roofs by running a vent along the roof ridge. Such vents are created by an open slot running along the roof ridge, essentially the length of the roof, which causes ventilation out of the attic by convection airflow and by suction from wind blowing across the roof.

Differences between the various types of ridge vents are often found in the capping structures used over the vent slot to exclude water and pests. Various types of ridge vents and capping structures are known in the art. The present inventor has developed a number of novel venting configurations for various asphalt, metal and tile roofs over the years. One early development used a unitary mat constructed of randomly-aligned synthetic fibers which are joined by phenolic or latex binding agents and heat cured to provide an air-permeable mat with a varying mesh. Cap shingles are supported by the mat and are nailed directly to the roof through the mat. However, this arrangement does not prevent the ingress of moisture through the cap shingles that then travels into the open ridge slot. The mesh is also subject to various manufacturing issues. Additionally, this earlier vent was generally only usable for flat roof types, and cannot be used in conjunction with contoured roofs or with heavy roofing tiles. As used herein, the phrase "heavy roofing tiles" refers to tiles made from materials which include, but are not limited to, slate, terra cotta, concrete, and clay. These tiles are distinguished by their bulk and weight, as contrasted to the relatively lighter shingles made of asphalt, wood, fiberglass, polymers and the like.

The prior known vent structures useable with such heavy roofing tiles generally included structure to support the capping elements, which are frequently heavy ridge cap tiles of same or similar shape and construction as the roof tiles, for example, as provided in the inventor's prior U.S. Pat. No. 5,326,318. However, the construction of an assembled support from bent-up sheet metal and porous vent material requires shipment in fixed lengths. The cost for making and shipping this type of vent would therefore be high. Additionally, if the roof tiles and cap tiles were "mudded" into position with cement to close the gaps between the overlapping cap tiles, as well as the gaps between the bottom of the cap tiles and the valleys of the roof field tiles along the roof ridge, these gaps, which were intended to remain open for venting in such prior known systems, would likely be filled with cement in accordance with customary roofing practices to prevent leaks, and therefore block any air flow that the vent was intended to provide.

A contoured roof ridge ventilation system for metal roofs has also been developed by the present inventor, and is described in U.S. Pat. No. 5,561,953. This system is intended for use with metal roof panels having a contoured surface, and provides a contoured ventilation strip covered with a flat cap that is nailed to the roof structure. This does not address tile roofs, in which not only the field of the roof is contoured, but also the cap is cylindrical shaped and tiled, such that the bottoms of the cap tiles do not present an even surface, and in which rain driven parallel to the roof ridge may penetrate between the cap tiles.

In the inventor's prior U.S. Pat. No. 6,902,476, many of these issues are addressed by another type of roof vent that is specifically adapted to tile roofs, but which can still be provided in roll form that is easily cut to length by the roofer and allows for simple installation. However, it would be desirable to ensure that no wind driven rain can penetrate the ridge vent, even in hurricane conditions.

SUMMARY

The present invention is directed to a novel roof ridge ventilation system which is designed for use with heavy ridge tiles, and to a method of venting such tiled roofs with this novel system. In particular, it is designed for typical tile roofs, wherein the tiles have a generally semi-circular section profile, and are laid in rows alternatingly inverted and overlapped with the preceding row to form an undulating sequence of crests and gutters. The same or similar shaped tiles are then laid along the ridge and affixed to the ridge pole to cap over the vent slot and to impart a rounded appearance to the ridge. In another aspect, the ridge vent can also be used for tile roofs having flat field tiles.

The present invention provides a ridge vent for tile roofs. The vent comprises a center baffle that is installed over the ridge pole and a vent strip located on each side of the ridge. Each vent strip includes a vent material, preferably formed from a non-woven mat that includes a first surface, which can be flat or is contoured to a profile to match a profile of the tile roof, and a second surface. An upper water barrier is attached to the second surface and extends over the roof ridge. In an alternate embodiment of the present invention, the center baffle may be replaced with a center water dam assembly which includes additional strips of vent material located adjacent to either side of the ridge pole, as well as a lower water barrier attached to each side of the addition vent strips. The ridge vent pieces can be provided separately or can be connected together for simpler installation.

In one assembled embodiment, the center baffle or water dam is connected to a flexible holder that is used to connect the vent strips to one another. The flexible holder allows the positions of the vent strips to be independently adjusted for alignment with the roof tiles on either side of the ridge. The upper water barrier overlaps both vent strips. The upper water barrier directs any moisture that passes through the cap tiles away from the vent slots through the roof structure. The vent assembly is rollable for easy transport, storage and use on the roof.

In another embodiment where at least some of the pieces are provided as separate pieces, the center baffle or water dam, which is rollable, is first installed on the ridge pole, preferably using a temporary adhesive and/or nails. After the last course of tiles is set up to the ridge vent slot, the strips of vent material are separately installed. The upper water barrier can be provided separately, or can be connected to one or both of the strips of vent material.

BRIEF DESCRIPTION OF THE DRAWINGS

The present invention will be explained in more detail in connection with the drawings in which presently preferred embodiments are shown.

FIG. 3 is a cross-sectional view similar to FIG. 1 of a second embodiment of a roof ridge vent arrangement for tile roofs in accordance with the invention.

FIG. 4 is a flat pattern view of the center baffle used in the first and second embodiments of the invention shown in FIGS. 1 and 3.

FIG. 5 is a cross-sectional view of a stand-off molded into the center baffle taken along line 5-5 in FIG. 4.

DETAILED DESCRIPTION OF THE PREFERRED EMBODIMENTS

Figure 1:
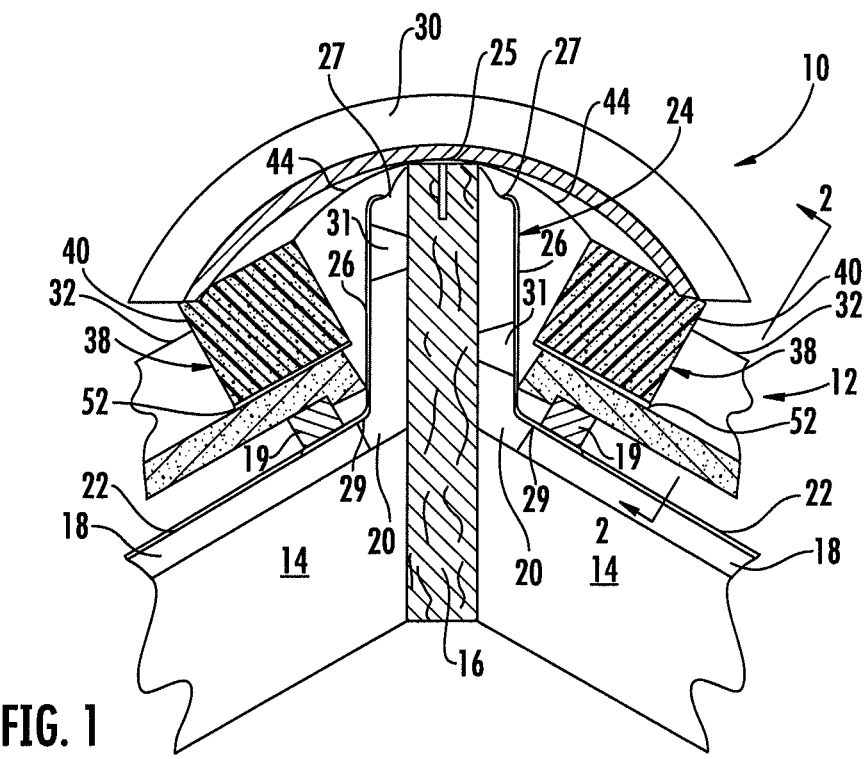
FIG. 1 is cross-sectional view of a first embodiment of a roof ridge vent arrangement for tile roofs in accordance with the present invention.

Certain terminology is used in the following description for convenience only and is not considered limiting. Words such as "front," "back," "top," and "bottom" designate directions in the drawings to which reference is made. This terminology includes the words specifically noted above, derivatives thereof and words of similar import. Additionally, the terms "a" and "one" are defined as including one or more of the referenced item unless specifically noted.

The preferred embodiments of the present invention will be described with reference to the drawing figures, where like numerals represent like elements throughout.

Referring now to FIG. 1, a ventilation system 10 for a tile roof 12 is shown. The tile roof 12 includes a roof structure formed from roof rafters 14 that are connected to a ridge pole or beam 16. Sheathing 18 may be applied over the rafters 14, as shown, and a gap or slot 20 is left on each side of the ridge pole 16 for the ridge vent. Nailer boards 19 may be located along the slots 20 for engaging the last course of tiles. Alternatively, purlins or other support structures can be utilized. The ridge pole 16 extends above the sheathing 18, or is built up to a desired height, so that the cap shingles 30 for the tile roof 12 can be affixed to it. Roofing felt or another water barrier 22 is applied over the sheathing 18. The roof tiles 32 are then placed in position on the roof until the final, uppermost row of tiles 32 ends at a point below the slots 20.

Figure 6:
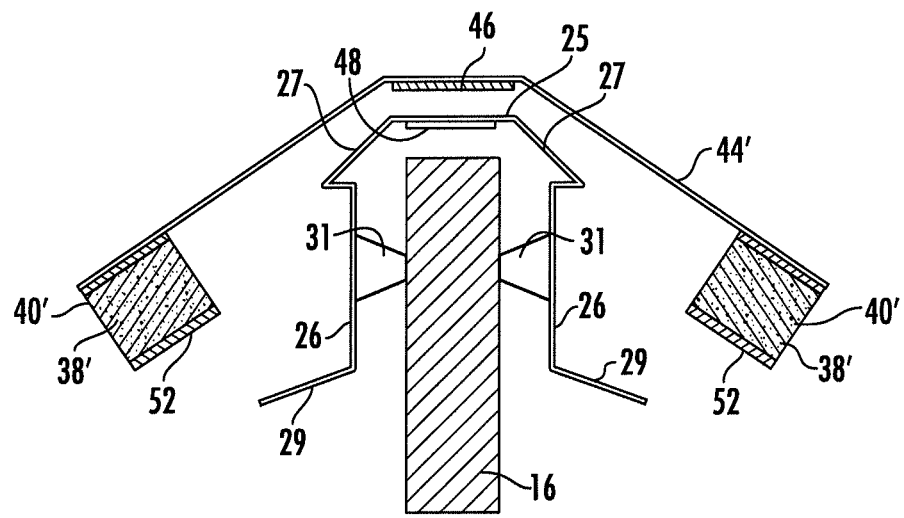
FIG. 6 is a partially schematic cross-sectional view of the assembly of the roof ridge vent arrangement of FIG. 1 for tile roofs with a generally flat profile.
Figure 7:
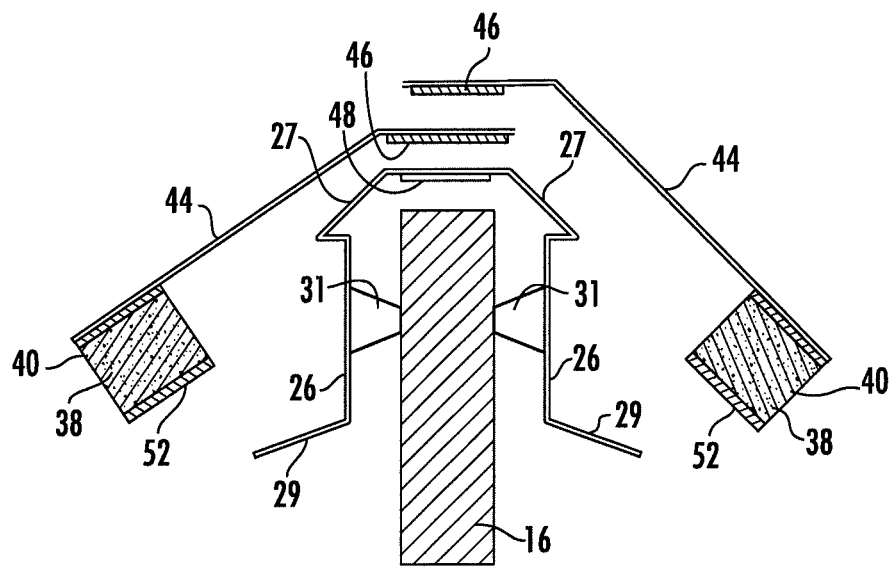
FIG. 7 is a partially schematic cross-sectional view of the assembly of the roof ridge vent arrangement of FIG. 1 for tile roofs with a curved profile.

In a first preferred embodiment, as shown in FIG. 1, the ventilation system 10 is comprised of a center baffle 24 that extends over the top of the ridge pole 16 and down both sides. The center baffle 24, which is shown in a flat pattern in FIG. 4, includes a center holding strip 25 that is centered over the ridge pole 16. Adhesive material 48 can be pre-applied to the center holding strip 25 to assist in assembly on the roof (FIGS. 6 and 7). Alternatively or in addition, nails can be driven through the center holding strip 25 into the ridge pole 16.

Baffles 26 are located on each side of the center holding strip 25, and are connected to it by connector strips 27, which generally have a width of less than 0.25 inches and preferably have a length of at least one inch. A fold line 28 is formed near the outer edge of each of the baffles 26, and a flange 29 is formed across the fold line 28 as an integral extension of each of the baffles 26. The fold line preferably forms a pre-fold of about 45°; however, the material of the center baffle 24 is preferably flexible so that the angle can be adjusted to the particular pitch of the roof at installation. Stand-offs 31 are located on, formed in, or attached to the baffles 26. As shown in FIGS. 4 and 5, the stand-offs 31 preferably have a depth "X" of at least 0.75 inches, and more preferably have a depth X greater than or equal to one inch. The stand-offs 31 are preferably located in each of the baffles 26, and are spaced apart in a longitudinal direction (the direction of the roof ridge) between 6 and 15 inches, and more preferably between 9 and 12 inches. Preferably the center baffle 24 is made of a polymeric material, such as PVC or polyethylene, and the stand-offs 31 are formed or heat pressed therein. The connector strips 27 are formed by punching out the intermediate pieces of material. The entire center baffle 24 is flexible and rollable, allowing it to be easily carried onto a roof for installation and cut to the proper length so that seams can be avoided.

The center baffle 24 is preferably installed over the ridge pole 16 with the baffles 26 extending down generally parallel to and offset from the ridge pole sides due to the stand-offs 31. The flanges 29 are then preferably located on top of the sheathing 18 and water barrier 22, and held in place with the uppermost nailer boards 19, adjacent to the ridge vent slots 20.

For contoured tile roofs, vent strips 38, which are formed from a contoured strip of vent material 40, are installed after the final course of roof tiles 32 have been placed. The vent material 40 is preferably a non-woven synthetic material that has a high net open free area to allow for air passage therethrough, while acting as a filter to prevent ingress by bugs or debris. The material also generally prevents moisture permeation, such as wind driven rain, while still allowing air flow for attic ventilation. A preferred material is disclosed in the inventor's prior U.S. Pat. No. 5,167,579. However, other suitable mesh materials, whether woven or non-woven may be utilized.

The vent material 40 has a first surface 42 which is contoured with a complementary profile to the roof tiles 32, and a second surface, generally opposite to the first surface that is generally flat. The vent material 40 preferably has a thickness that is greater than a depth of the valleys in the roof tiles 32 so that it can be contoured and remain in one piece. The material 40 may be formed as a single piece, or may be made of a plurality of pieces of material that are connected together, such as by adhesives, sewing, heat staking, heat or friction welding or fusion.

The vent material 40 is preferably adhered to the roof tiles 32 by an adhesive 52 applied to at least one of the vent material 40 and the roof tiles 32. The adhesive 52 is preferably pre-applied on the roof side of the vent strips 40. The adhesive 52 may include a fluid or semi-solid substance applied to at least one of the vent strips 38 and the roof tiles 32 during the installation process. Alternatively, the adhesive 52 may include adhesive strips, of the type known in the art, supplied pre-attached along the roof-facing surface of each vent strip 38, 38'. These adhesive strips preferably include a release strip which, when removed, reveals an adhesive such as acrylic or silicone.

An upper water barrier 44 is affixed to the second surface of the vent material 40. For contoured tile roofs, the upper water barrier 44 is wide enough so that it will extend over the ridge pole 16 in the installed position, and at least partially overlaps the upper water barrier 44 extending from the other strip of vent material, as shown in FIG. 7. This allows the two vent strips 38 to be adjusted in the longitudinal direction to match the contour of the tiles on each side of the roof.

The upper water barrier is preferably made of a closed cell foam material or a polyvinyl chloride or other polymeric sheet material, but may be made from any suitable water resistant material that can be adhered to or affixed to the vent material 40, such as by an adhesive, heat staking, sewing, solvent or heat welding, or by any other suitable means. An adhesive material 46 may be applied to one or both sides of the free ends of the upper water barriers 44, so that upon installation, the upper water barriers 44 from the vent strips 38 overlap and can be adhered to one another. However, this is not required. As shown in FIG. 1, preferably the upper water barrier 44 has some stiffness and is bowed outwardly, toward the underside of the ridge cap tiles 30.

For flat tiles, as shown in FIG. 6, the vent strips 38' do not need to be contoured, and a single upper water barrier 44' can be used with one vent strip being connected to each longitudinal edge. Adhesive material 46 is preferably provided in the center area for connection onto the center holding strip 25 of the center baffle 24.

Figure 8:
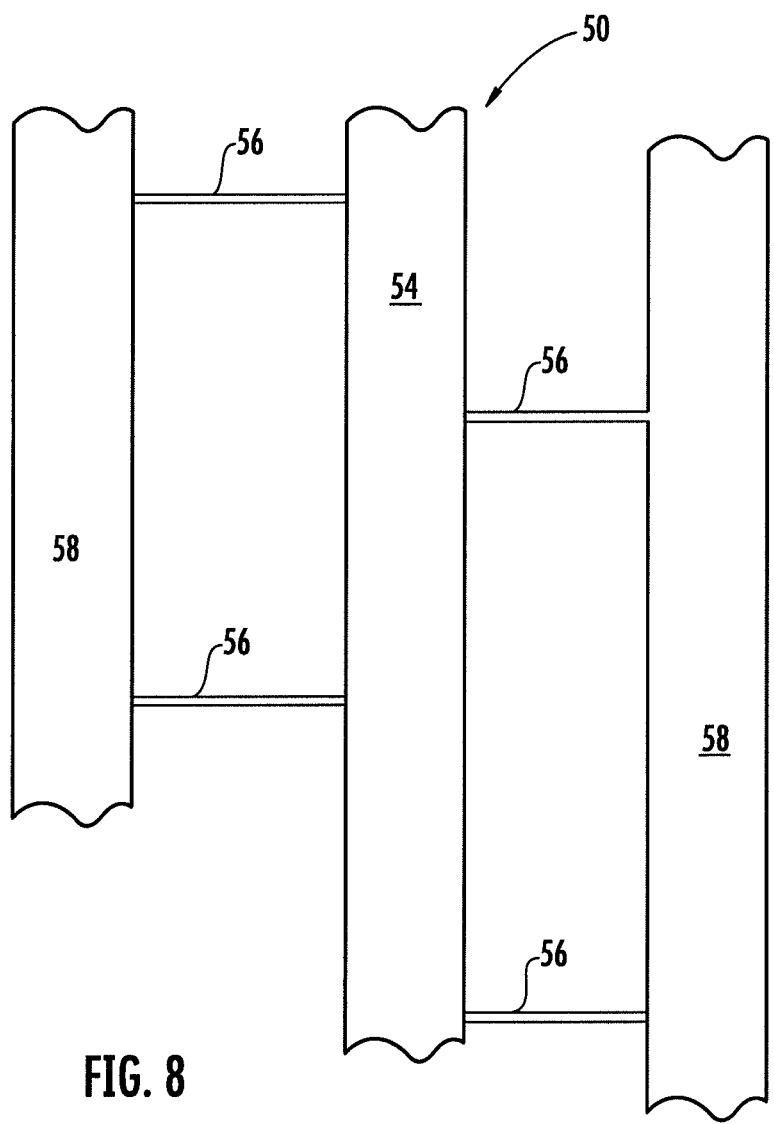
FIG. 8 is a flat pattern view of a flexible carrier for the vent strips used in the embodiment of FIG. 3.

In a second preferred embodiment of the invention, shown in FIG. 3, the profiled vent strips 40 are connected to a separate flexible carrier 50. The carrier 50, shown in FIG. 8, has a centering strip 54 which allows assembly with the center baffle 24 and the upper water barrier 44'. The connector strips 56 end in attachment strips 58 along the longitudinal edges for attachment to the profiled vent strips 40. Connector strips 56 are provided with a length which is sufficient to allow the contour of each of the profiled vent strips 40 to be aligned with the roof tiles 32. The connector strips 56 are preferably at least 3 inches long and preferably less than 0.25 inches wide. The strips 56 are preferably spaced apart by at least 6 inches and more preferably are 12 to 15 inches apart. Preferably, the flexible carrier 50 is made of a stamped or punched PVC sheet. However, other materials can be utilized. The center baffle 24, the carrier 50 with the profiled vent strips 40, and the water barrier 44 can be pre-assembled by gluing or heat staking along the center section that attaches to the ridge pole 18. The entire assembly remains rollable due to the flexibility of the materials.

Figure 9:
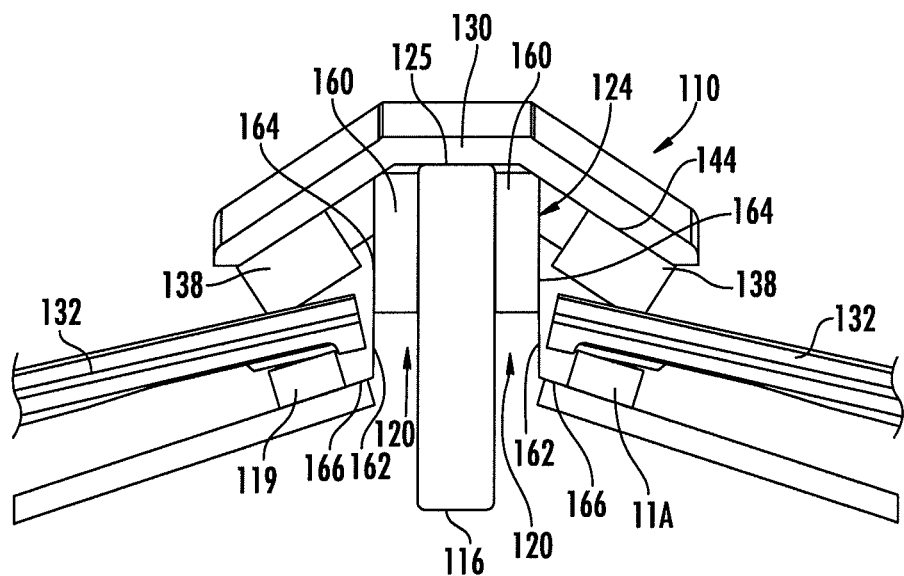
FIG. 9 is a cross-sectional view of a third embodiment of a roof ridge vent arrangement for tile roofs in accordance with the present invention.

In reference to FIG. 9, a ventilation system 110 according to a third preferred embodiment of the present invention is shown. In this embodiment, the center baffle is replaced with a center water dam assembly 124. The center water dam assembly 124 includes a ridge pole cap 125, vent strips 160, and lower water barriers 162. Attached to the outward facing sides of the ridge pole cap 125 are vent strips 160, preferably comprised of a non-woven synthetic material similar to that described above with respect to the first preferred embodiment. The vent strips 160 are preferably attached to the ridge pole cap 125 by an adhesive, or adhesive strip, applied to at least one of the vent strip 160 and the ridge pole cap 125.

The lower water barriers 162 are secured to the vent strips 160 on an upper portion 164 thereof, preferably by an adhesive. The water barriers 162 may also include a down-turned or hooked portion on an end of the upper portion 164 in order to more effectively prevent in ingress of moisture and debris. The lower water barriers 162 are preferably formed of a flexible material, such as stamped or punched PVC sheet, so that the angle of the flanges 166, formed in the lower water barrier, can be adjusted to fit the particular pitch of a roof.

For installation, the ridge pole cap 125 is placed over the ridge pole 116 and preferably is fixed thereto by an adhesive material, nails, screws, or other suitable fastening means. The flanges 166 are placed on top of the sheathing 118, and held in place with the nailer boards 119, adjacent to the ridge vent slot 120, in a manner similar to that described above with respect to the first embodiment of the present invention.

Vent strips 138 are placed on either side of the ridge vent slots 120 and are preferable adhered to roof tiles 132 in the manner described above with respect to the first embodiment. Similarly, the vent strips 138 may be joined with at least one, and preferably two, upper water barrier 144 in the manner described above with respect to FIGS. 6 and 7. The separate flexible carrier described in the second embodiment may also be utilized to connect the vent strips 138.

Figure 10:
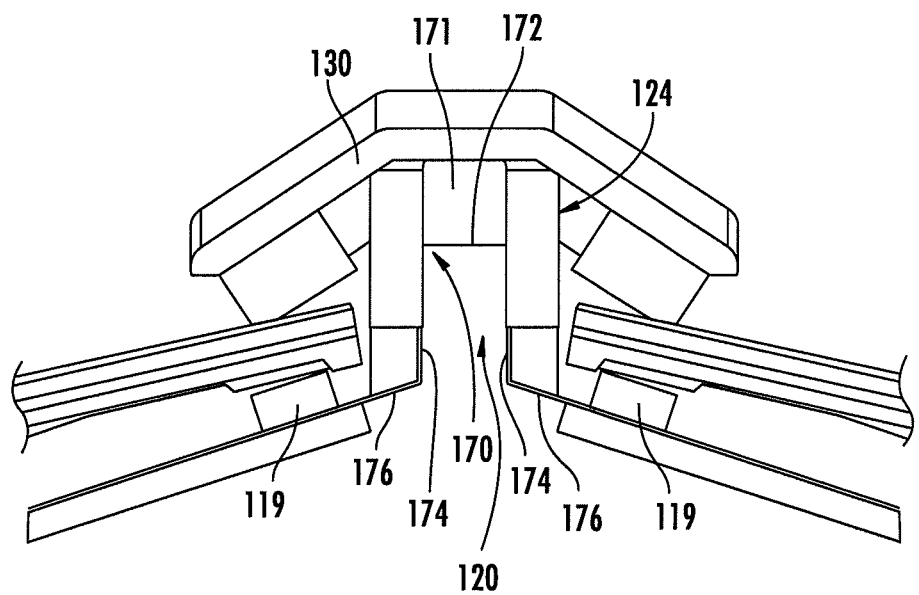
FIG. 10 is a cross-sectional view of a fourth embodiment of a roof ridge vent arrangement for tile roofs in accordance with the present invention.

In a fourth embodiment of the present invention, show in FIG. 10, a ridge riser bracket 170 is utilized in conjunction with the water dam assembly 124 described above with respect to the third preferred embodiment of the present invention. In this embodiment, the ridge pole has been replaced with a ridge riser board 171. The ridge riser bracket 170, used to support the ridge riser board 171, includes a ridge riser board opening 172, leg portions 174, and flanges 176. The ridge riser bracket 170 is configured to be fitted into the water dam assembly 124, with the ridge riser board 171 located in the ridge riser board opening 172.

Similar to the connector strips 27, 56 described in the first and second embodiments, the leg portions 174 and the flanges 176 of the ridge riser bracket 170 preferably comprise spaced apart strips with a width of preferably less than 0.25 inches, which permit air flow through the ridge riser bracket 170, and into the ridge gap 120. Preferably, the ridge riser bracket 170 is formed from metal. The flanges 174 are preferably secured to the roof to provide a ridge pole to connect the cap tiles.

Referring to FIGS. 1, 6, and 7, for installation of the first and second preferred embodiments, the center baffle 24 is first installed over the ridge pole 18. After the field tiles on the roof have been laid up to the upper course (below the vent slots 20), for the embodiment shown in FIGS. 1 and 7, the individual profiled vent strips 40 with the attached upper water barriers 44 are then installed. The contoured surface 42 of each strip 38 is aligned with the complementary projections and recesses of the roof tiles 32, with the upper water barriers 44 overlapping one another over the ridge pole 16. For the embodiment of FIG. 6, for flat tiles, the upper water barrier 44' with the non-profiled vent strips 40' is installed as a single piece over the ridge pole. The cap tiles 30 can then be placed to complete the installation.

Figure 2:
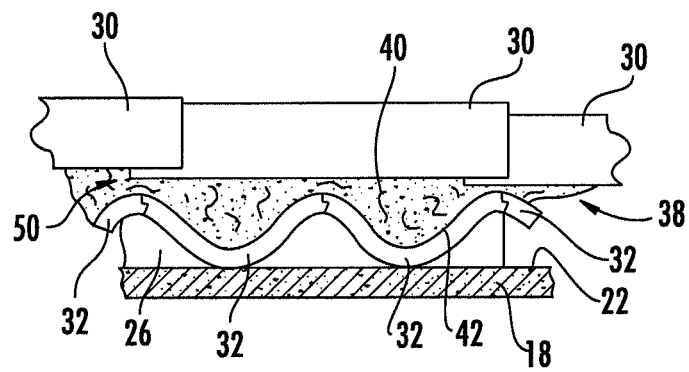
FIG. 2 is a view taken along line 2-2 in FIG. 1.

As shown in FIG. 1, the vent material 40 is partially compressed by the cap tiles 30 so that the gaps (indicated at 50 in FIG. 2) created by overlapping cap tiles 30 are filled. Additionally, in a preferred embodiment where the vent material is at least partially formed of a non-woven synthetic fiber matting as described, for example in U.S. Pat. No. 5,167,579, the vent material 40 is preferably heated so that it "lofts" or expands and is then calendered down to a specific thickness prior to the profiles being cut to match the roof contours. Since the material 40 is calendered, it can also expand somewhat due to sun generated heat on the roof after installation in order to further fill the gaps 50 to prevent the ingress of insects or debris.

With respect to the embodiment of FIG. 3, the entire venting assembly, including the center baffle 24, carrier 50 with profiled strips and upper water barrier 44', is attached to the ridge pole 16, preferably with adhesive and/or nails. The flanges 29 of the center baffle 24 are connected to the sheathing 18, over the water barrier 22. The roof field tiles 32 are laid in the usual manner and the vent strips 40 and upper water barrier 44' are flexed upwardly to allow the final upper course of tiles 32 to be laid up to a position adjacent to the vent slots 20. The profiled vent strips 40 can then be longitudinally adjusted to match the contour of the roof tiles due to the length and flexibility of the connector strips 56. The upper water barrier 44' remains in place, and the cap tiles 30 can then be installed in the usual manner.

In use, the upper water barriers 44, 44' prevent any moisture which may permeate the seams between the overlapping ridge cap tiles 30 from penetrating the roof structure through the slots 20. Any wind driven moisture that is driven up the roof slope is stopped by the vent material 40, 40' or the baffle 26, which returns any water that permeates the vent material 40, 40' back down the roof. Air flow occurs over the baffles 26 through the spaces between the connector strips 27, and in the embodiment of FIG. 3, also between the connector strips 56. This provides a high net free area for ventilation with superior resistance to the ingress of moisture from wind driven rain in a rollable product.

With respect to the third embodiment of the present invention shown in FIG. 9, the center water dam 124, including the ridge poll cap 125, vent strips 160, and the lower water barriers 162, is attached to the ridge pole 116, preferably with adhesive and/or nails. The flanges 166 of the lower water barriers 162 are connected to the sheathing 118 over the water barrier 22. The individual vent strips 138 and upper water barrier 144 are then installed in the same manner as described above with respect to the first embodiment of the present invention.

The fourth embodiment of the present invention, shown in FIG. 10, is installed in a similar fashion. The ridge riser board 171 is fitted into the ridge riser bracket 170. The center water dam assembly 124 is then fitted over the ridge riser bracket 170 and the ridge riser board 171. The flanges 166, 176 of the lower water barriers 162 the ridge riser bracket 170 are connected to the sheathing 118 over the water barrier 22. The installation of the vent strips 138, the remaining roof tiles 132, and the cap tiles 130, is similar to that which is described above with respect to the first embodiments of the present invention.

In use, the third and fourth embodiments prevent moisture and debris from entering the roof slot 120 in much the same manner as the previous embodiments. The upper water barrier 144 prevents any moisture which may permeate the seams between the overlapping ridge cap tiles 130 from penetrating the roof structure through the slots 120. Wind driven moisture driven up the roof slope is stopped by the vent strips 138 and 160, or the lower water barrier 162. In the third embodiment depicted in FIG. 9, air flow occurs through the slots 120 and passes through the center water dam assembly 124 through the vent strips 160, and continues through the vent strips 138. In the fourth embodiment, air flow occurs again through the slots 120, continues through the openings between the leg portions 174 and the flanges 176 of the ridge riser bracket 170, enters the water damn assembly 124 through the vent strips 160, and proceeds through the vent strips 138.

Figure 11:
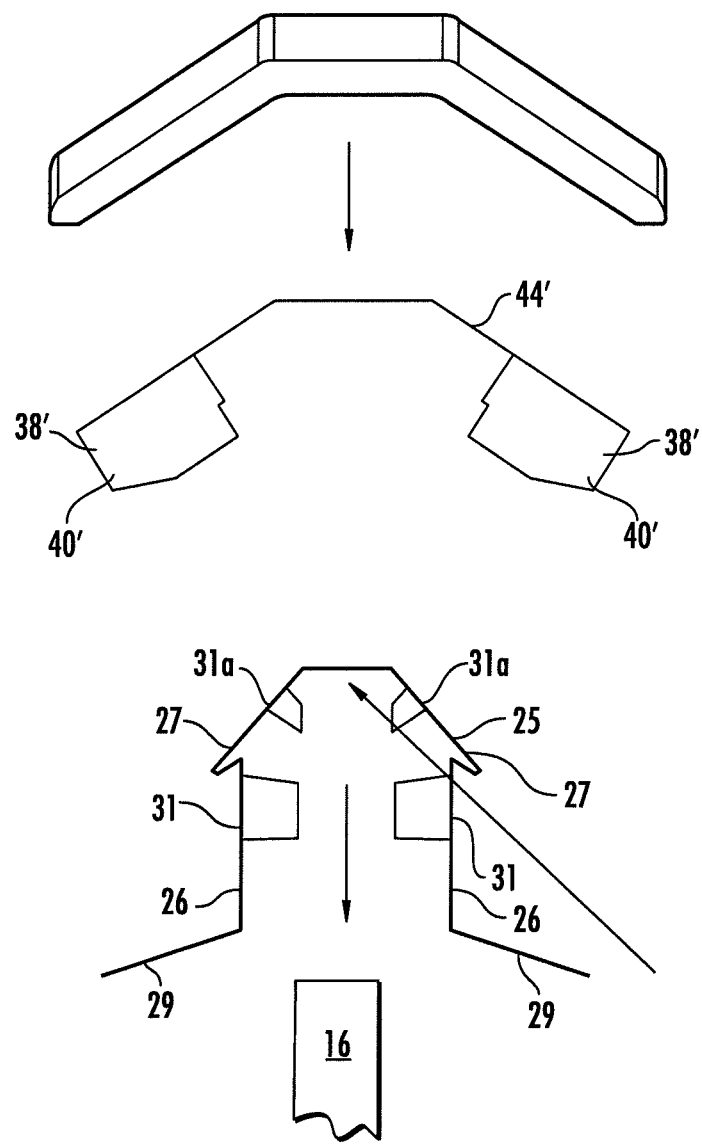
FIGS. 11, 12a and 12b are views of a commercial embodiment of the invention similar to FIG. 6.
Figure 12A:
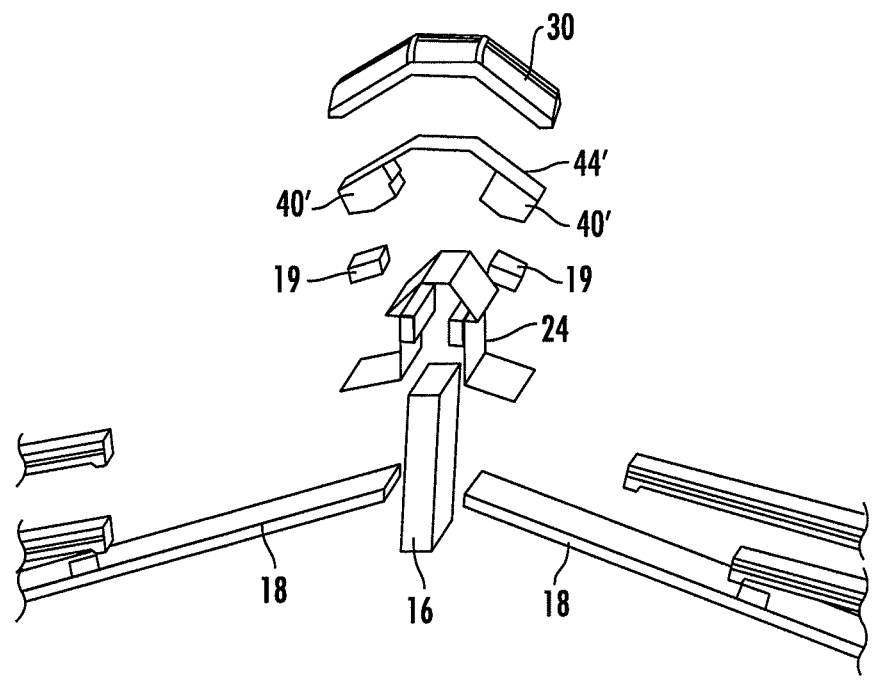
Figure 12B:
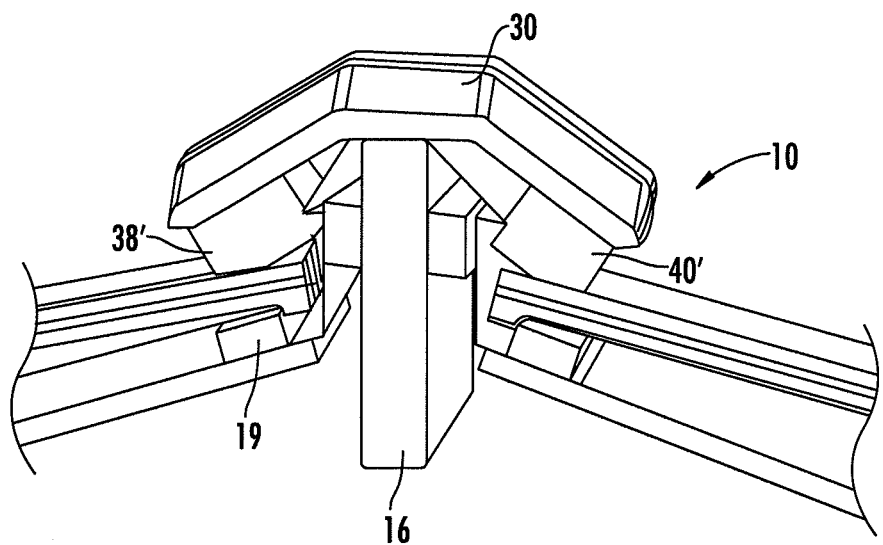

FIGS. 11, 12a and 12b show a commercial version of the embodiment of FIG. 6. The water dam provided by the center baffle 25 includes additional stand-offs 31a for better positioning on the ridge beam.

Figure 13:
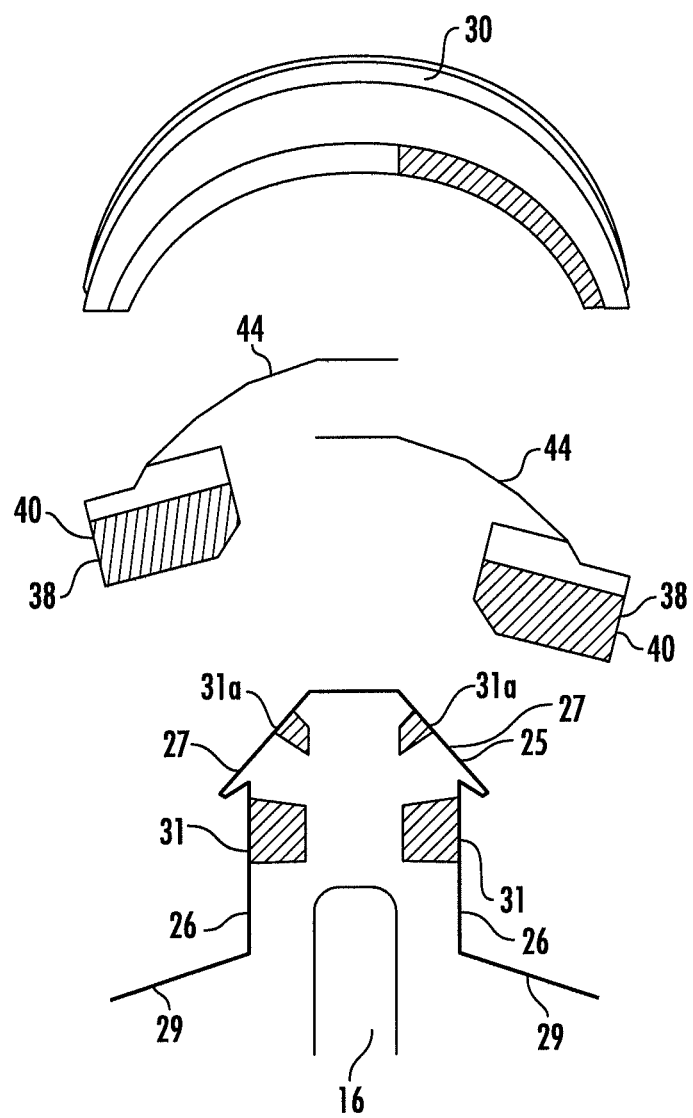
FIGS. 13, 14a and 14b are views of a commercial embodiment of the invention similar to FIG. 1.
Figure 14A:
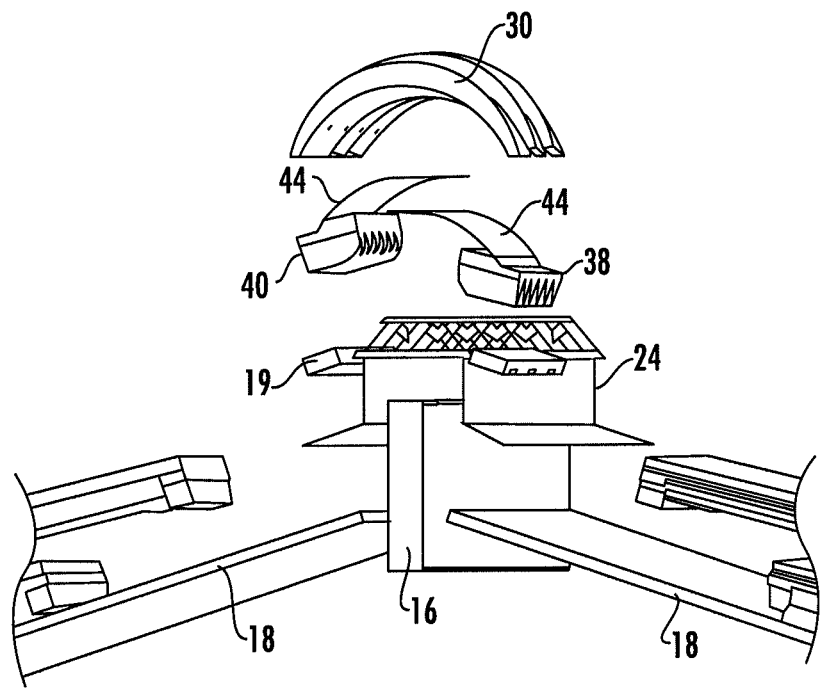
Figure 14B:
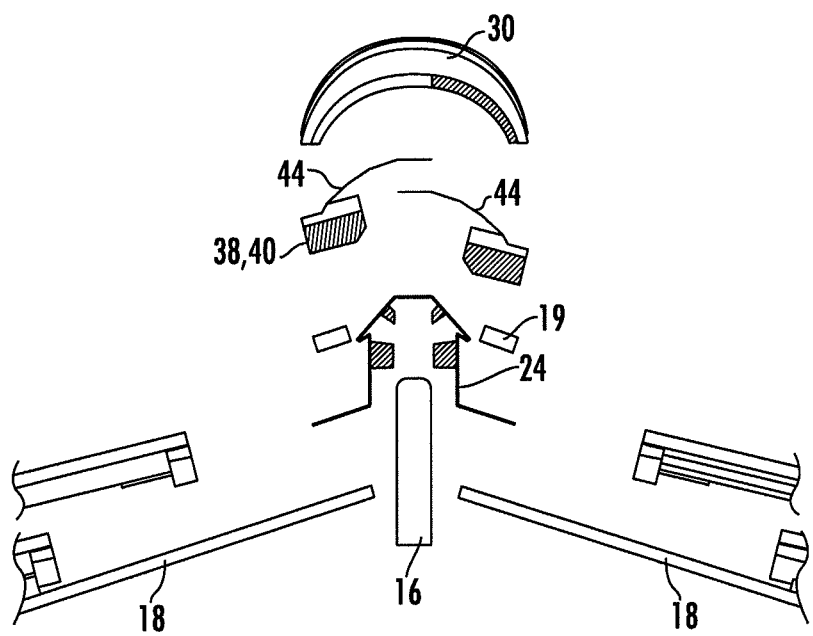

FIGS. 13, 14a and 14b show a commercial version of the embodiment of FIG. 1, with the extra standoffs 31a on the center baffle 25.

Figure 15:
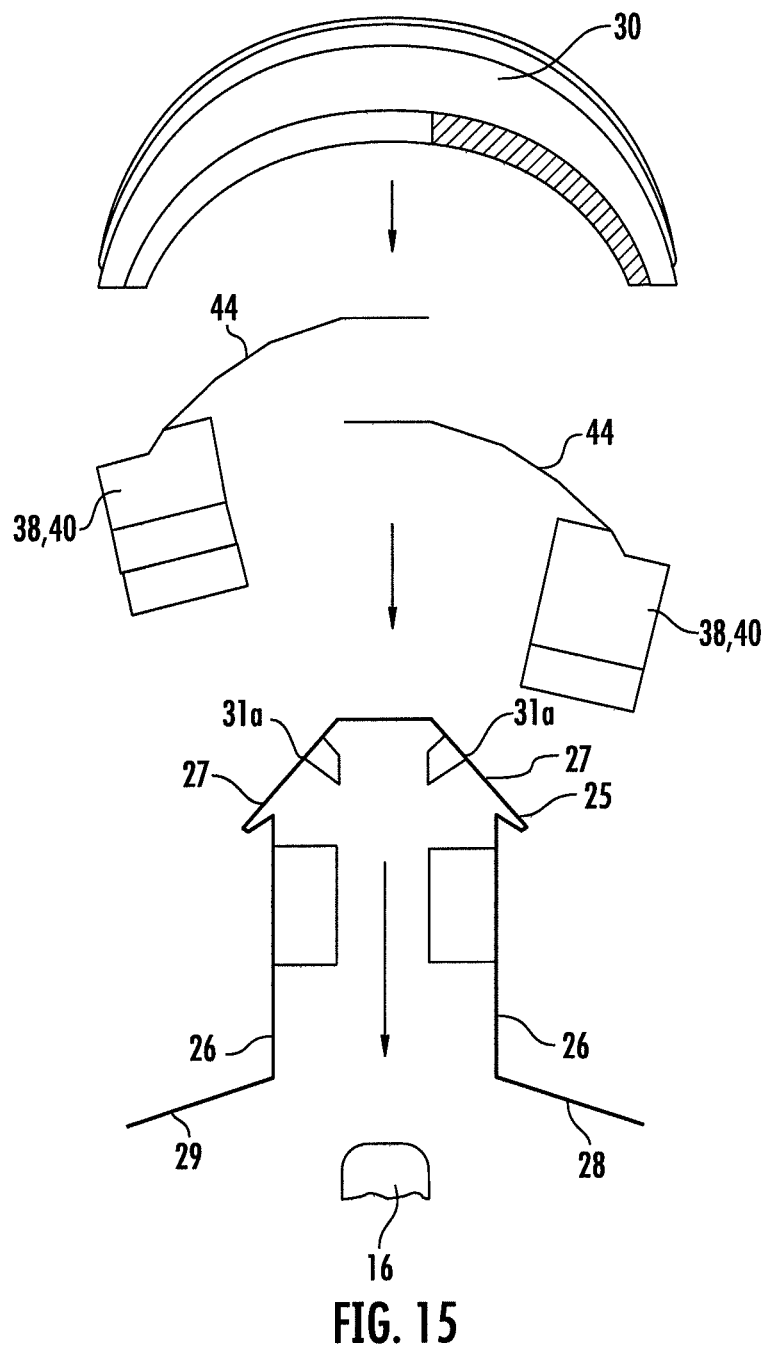
FIGS. 15, 16a and 16b are views of another commercial embodiment of the invention similar to FIG. 1.
Figure 16A:
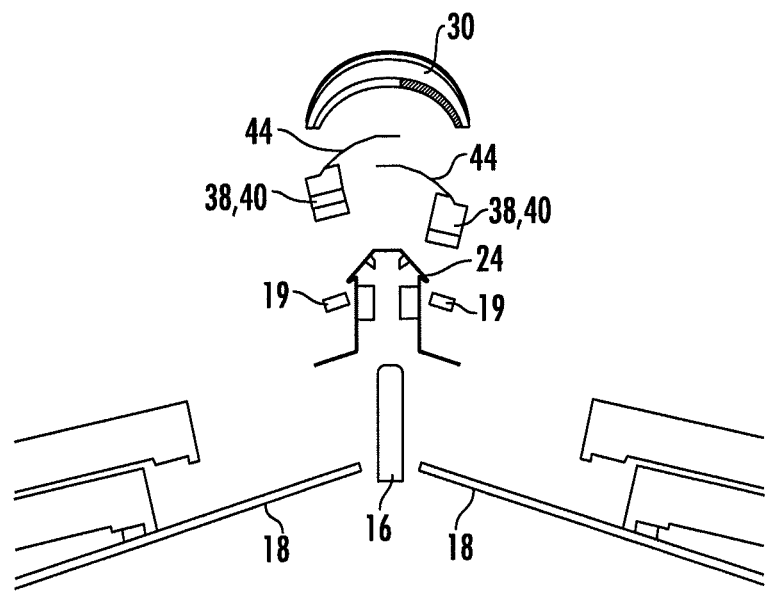
Figure 16B:
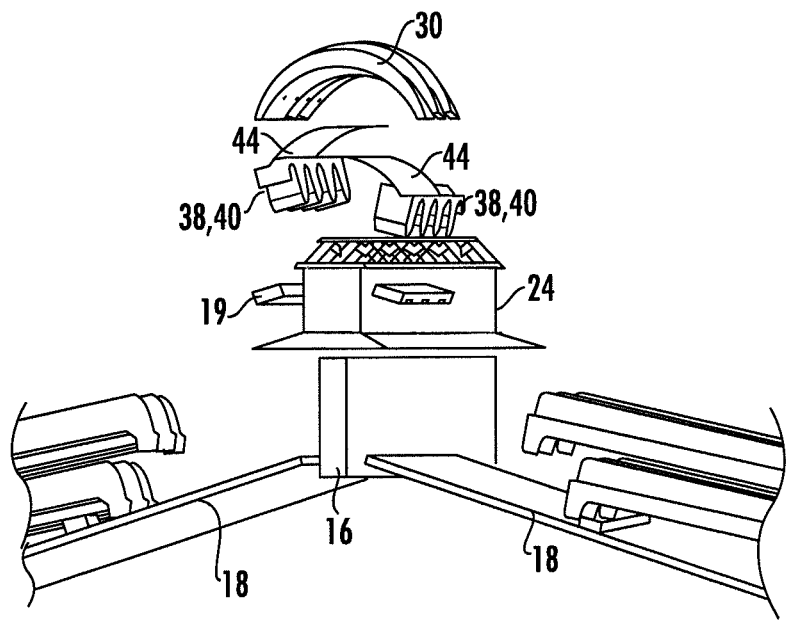

FIGS. 15, 16a and 16b show a third commercial embodiment similar to FIGS. 1, 13, 14a and 14b. Here, the vent strips 40 have a deeper profiling to match the roof field tiles.

Figure 17:
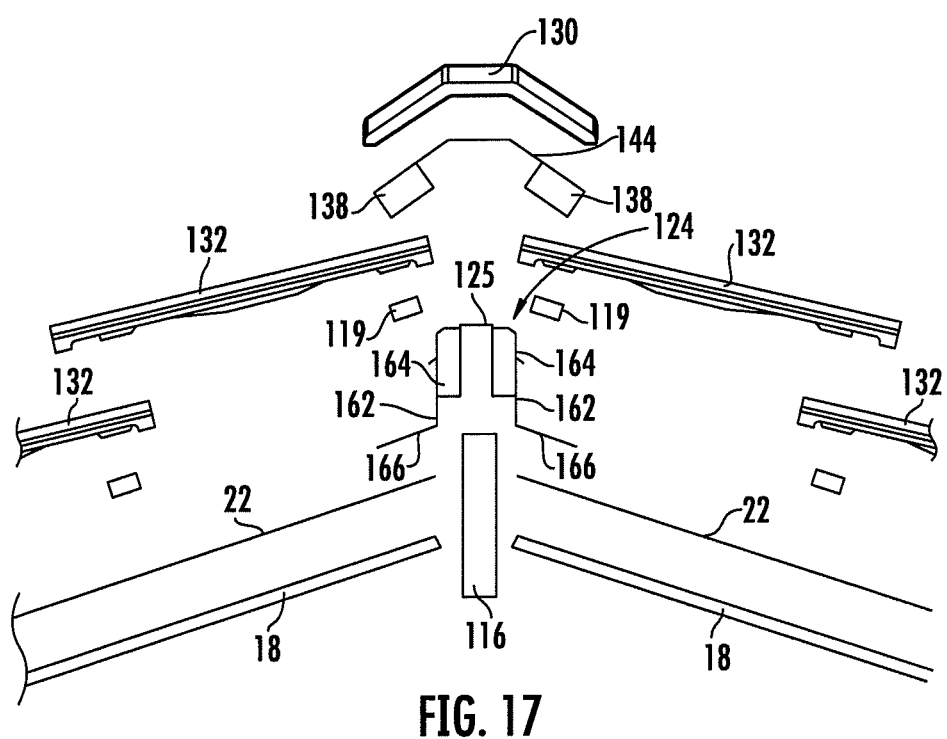
FIG. 17 is an exploded view of a commercial embodiment of the invention similar to FIG. 9.

FIG. 17 shows an exploded view of a commercial embodiment of the embodiment of FIG. 9. The subassembly of the center water dam 124 as a separate part is clearly visible.

Figure 18:
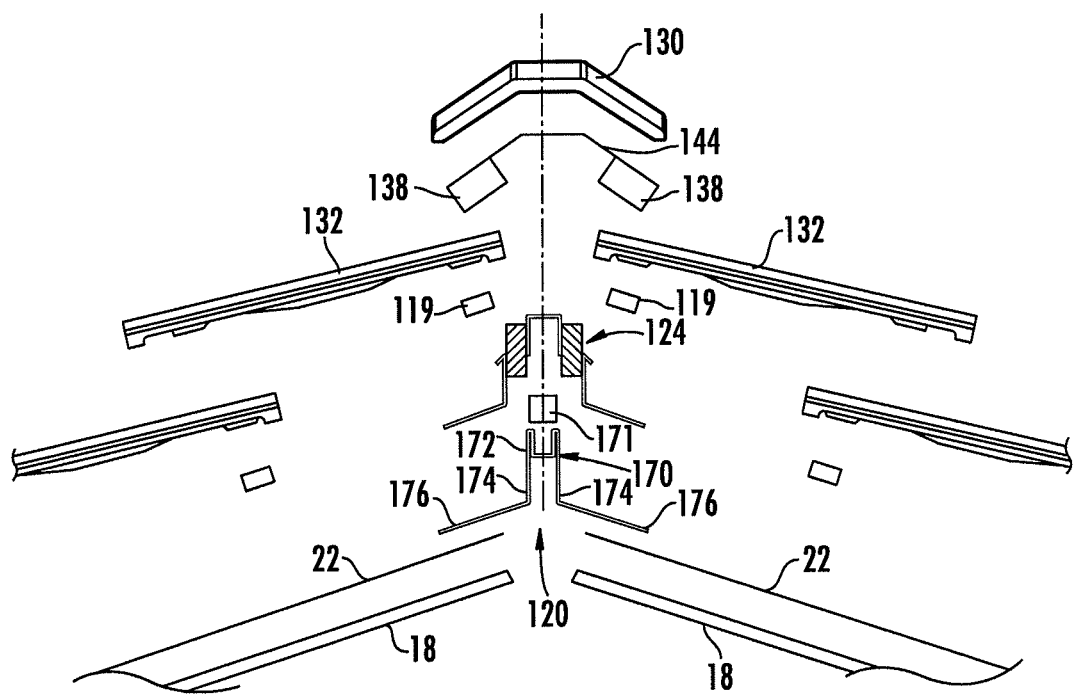
FIG. 18 is an exploded view of a commercial embodiment of the invention similar to FIG. 10.

FIG. 18 shows an exploded view of a commercial embodiment of the embodiment of FIG. 10.

While the preferred embodiments of the invention have been described in detail, the invention is not limited to these specific embodiments described above which should be considered as merely exemplary. Further modifications and extensions of the present invention may be developed and all such modifications are deemed to be within the scope of the present invention as defined by the appended claims.

What is claimed is:

1. A rollable roof ventilation system for a tile roof having a roof ridge, comprising:
    a center water dam assembly configured to be located over a ridge board, which includes a top, a first outward facing side, and a second outward facing side, the center water dam assembly comprising a ridge pole cap configured to be located over the top of the ridge board, a first vent strip, a second vent strip, a first lower water barrier, and a second lower water barrier, the first vent strip configured to be disposed on the first outward facing side of the ridge board, the second vent strip configured to be disposed on the second outward facing side of the ridge board, the first lower water barrier secured to an upper portion of the first vent strip and comprising a first flange configured to fit the pitch of the roof and be secured beneath a first nailer board on the roof, and the second lower water barrier secured to an upper portion of the second vent strip and comprising a second flange configured to fit the pitch of the roof and be secured beneath a second nailer board on the roof;
    wherein the first lower water barrier comprises a downturned portion or a hooked portion on an end of the upper portion of the first lower water barrier and the second lower water barrier comprises a down-turned portion or a hooked portion on the end of an upper portion of the second lower water barrier;
    a third vent strip having a first surface configured to be complementary to the tile roof, and a second surface generally opposite to the first surface; a fourth vent strip configured to be located generally parallel to the first vent strip and on an opposite side of the roof ridge with respect to the first vent strip, and having a first surface configured to be complementary to the tile roof, and a second surface generally opposite to the first surface; and
    at least one upper water barrier connected to at least one of the second surface of the third vent strip and the second surface of the fourth vent strip, and extending therefrom toward the roof ridge, wherein the first vent strip, the second vent strip, the third vent strip, and the fourth vent strip are comprised of a non-woven synthetic material, the first lower water barrier and the second lower water barrier are comprised of polyvinyl chloride sheet material, and the at least one upper water barrier is comprised of closed cell foam, polyvinyl chloride, or polymeric sheet material.

2. The roof ventilation system according to claim 1, wherein the at least one upper water barrier includes first and second water barriers attached to the third vent strip and fourth vent strip, respectively, each of the first and second water barriers extending from a respective vent strip over the top of the ridge board and toward each other and each of the first and second water barriers including respective free ends that overlap each other over the top of the ridge board.

3. The roof ventilation system according to claim 1, further comprising at least one ridge cap tile configured to be placed on the roof ridge, wherein first and second edges of the ridge cap tile are configured to rest on at least a portion of the second surface of the third vent strip and the second surface of the fourth vent strip, respectively.

4. The roof ventilation system according to claim 1, wherein the at least one upper water barrier comprises a single water barrier having a first end that is attached to the third vent strip, and a second end that is in contact with the fourth vent strip.

5. The roof ventilation system according to claim 1, wherein the at least one upper water barrier comprises a single water barrier, and a first end of the single water barrier is attached to the third vent strip, and a second end of the single water barrier is configured to be connected by an adhesive to the fourth vent strip.

6. The roof ventilation system according to claim 1, wherein the non-woven synthetic material is a synthetic fiber web treated with at least one binding agent.

7. The roof ventilation system according to claim 1, wherein the non-woven synthetic material of the third vent strip and the fourth vent material are heat treated to promote expansion and calendered to promote post-installation expansion of the non-woven synthetic material.

8. The roof ventilation system according to claim 1, wherein the non-woven synthetic material of the third vent strip and the fourth vent strip include contouring on the respective first surfaces for mating with complementing contouring of the tile roof.

9. The roof ventilation system according to claim 1, further comprising a flexible carrier attached between the third vent strip and the fourth vent strip.

10. The roof ventilation system according to claim 1, wherein the first flange is integral with the first lower water barrier, and the second flange is integral with the second lower water barrier.

11. A method of improving ventilation to a building comprising a roof including at least one vent slot disposed along a ridge board, and a plurality of mating tiles overlying the roof, the method comprising applying a water dam assembly having a centering portion and two leg portions over the ridge board, applying a first vent strip to the roof, the first vent strip including a first surface which conforms to the mating tiles and a second surface having at least a first upper water barrier attached thereto and extending therefrom, wherein the first vent strip is aligned generally adjacent to the roof ridge and wherein the water barrier at least partially bridges the roof ridge; applying a second vent strip to the roof, the second vent strip including a first surface which conforms to the mating tiles and a second surface, wherein the second vent strip is aligned generally adjacent to the roof ridge on an opposite side from the first vent strip.

12. The method according to claim 11, wherein the center water dam assembly and two leg portions comprises a center cap to which the two leg portions are attached, and the two leg portions comprise two baffles and standoffs to offset the baffles from the ridge board.

13. The method according to claim 11, further comprising the steps of: attaching a third vent strip to one of the two leg portions of the center cap, attaching a fourth vent strip to the remaining leg portion of the center cap, and attaching a first lower water barrier and a second lower water barrier to the third and fourth vent strips respectively.

14. The method according to claim 11, further comprising connecting a free end of the first water barrier to the second surface of the second vent strip.

15. The method according to claim 14, wherein the step of connecting the free end of the first water barrier includes attaching the free end of the water barrier to the second surface of the second vent strip by an adhesive applied to at least one of the second surface of the second vent strip and the free end of the water barrier.

16. The method according to claim 11, further comprising connecting at least one ridge cap tile having first and second ends to the roof along the roof ridge, wherein the first and second ends of the ridge cap tile rest on respective portions of the second surfaces of the first and second vent strips.

17. The method according to claim 16, wherein the step of providing a roof includes providing a roof with a ridge board, aligned with the roof ridge and connected to roofing rafters adjacent to the at least one vent slot, and further comprising connecting the ridge cap tile to the ridge board.

18. The method according to claim 17, further comprising the step of positioning free ends of the first and second upper water barriers on the ridge board.

19. The method according to claim 18, further comprising the step of attaching the free end of the first upper water barrier to the free end of the second upper water barrier.

* * * * *